(12) United States Patent
Deutsch et al.

(10) Patent No.: US 7,012,168 B1
(45) Date of Patent: Mar. 14, 2006

(54) BORON-BASED CONTAINMENT MATRIX FOR THE STORAGE OR TRANSMUTATION OF LONG-LIFE RADIOACTIVE ELEMENTS

(75) Inventors: Sylvain Deutsch, Gouvieux (FR); Philippe Bry, Palaiseau (FR); Dominique Gosset, Bourg la Reine (FR); David Simeone, Antony (FR)

(73) Assignee: Commissariat A L'Energie Atomique, Paris (FR)

( * ) Notice: Subject to any disclaimer, the term of this patent is extended or adjusted under 35 U.S.C. 154(b) by 522 days.

(21) Appl. No.: 10/089,099

(22) PCT Filed: Oct. 12, 2000

(86) PCT No.: PCT/FR00/02841

§ 371 (c)(1),
(2), (4) Date: Jun. 5, 2002

(87) PCT Pub. No.: WO01/27934

PCT Pub. Date: Apr. 19, 2001

(30) Foreign Application Priority Data

Oct. 13, 1999 (FR) .................................... 99 12766

(51) Int. Cl.
*G21F 9/00* (2006.01)
*G21F 9/16* (2006.01)

(52) U.S. Cl. .............................. 588/2; 588/10; 588/11; 588/12

(58) Field of Classification Search .................... 588/2, 588/9, 10, 11, 12, 13, 14, 15
See application file for complete search history.

(56) References Cited

U.S. PATENT DOCUMENTS 5,082,603 A * 1/1992 Horie et al. ................... 588/15

FOREIGN PATENT DOCUMENTS

| EP | 0 058 618 | 8/1982 |
|---|---|---|
| FR | 2 503 695 | 10/1982 |

* cited by examiner

*Primary Examiner*—Stanley S. Silverman
*Assistant Examiner*—Peter J. Lish
(74) *Attorney, Agent, or Firm*—Oblon, Spivak, McClelland, Maier & Neustadt, P.C.

(57) ABSTRACT

The invention relates to a confinement matrix for the storage or incineration of at least one long-life radioactive element, comprising at least one crystalline boron compound of a rhombohedral structure including the long-life radioactive element(s).

The boron compound may be of the $B_3Si$, $B_6O$ or $B_4C$ type.

15 Claims, No Drawings

BORON-BASED CONTAINMENT MATRIX FOR THE STORAGE OR TRANSMUTATION OF LONG-LIFE RADIOACTIVE ELEMENTS

FIELD OF THE INVENTION

The present invention relates to a confinement matrix for the storage of radioactive waste, composed of long-life radioactive elements such as long-life fission products and actinides. It also relates to the incineration of such elements, particularly actinides.

In used nuclear fuel reprocessing plants, some long-life actinide elements and long-life fission products remain at the end of processing, which must be conditioned with a view to long-term storage in very resistant matrices.

The materials that can be used as a matrix must have very high chemical stability, radiation stability and temperature stability characteristics to isolate the radioactive elements from the environment and keep them in this isolated state for very long periods due to their half-life value.

In the case of actinides, it is also possible to process said radioactive waste by means of transmutation in nuclear reactors, said operation being referred to in this document as "incineration". Therefore, it is also advisable to include them in matrices liable to be subjected to irradiation.

STATE OF THE RELATED ART

Presently, the matrix selected for the long-term storage of long-life radioactive waste is glass, but research is ongoing to find new materials offering even better characteristics for this conditioning.

Following recent research, it was proposed to condition said waste in apatitic matrices, as disclosed in WO95/02886 [1]. Research was continued to find other materials liable to be used as a confinement or incineration matrix for long-life radioactive elements such as long-life fission products such as Cs, Sr, Tc, etc., and actinides.

Of the materials that could be envisaged, boron-based materials could be of interest since boron is a neutron absorbing or moderating element. To date, only one boride such as boron carbide has been used as an absorbent in fast-neutron nuclear reactor and pressurised water reactor control rods and as a moderator for incineration targets. In this way, it was observed that this material shows a high stability under irradiation due to its specific crystalline structure. However, it is subject to accelerated corrosion in aqueous media, which renders it unfit for use as a confinement matrix for long-term storage in geological formations due to the possible presence of water.

DESCRIPTION OF THE INVENTION

The present invention specifically relates to the use of $B_4C$ and other boron compounds as a confinement matrix for the long-term storage or incineration of long-life radioactive elements.

According to the invention, the confinement matrix for the storage or incineration of at least one long-life radioactive element, comprises at least one crystalline boron compound of a rhombohedral structure including the long-life radioactive element(s).

In this way, the boron compounds used comprises a crystalline structure similar to that of boron carbide, which is characterised by a rhombohedral mesh which is composed, firstly, of a basic structure composed of a rigid network of polyhedrons of 12 atoms, referred to as icosahedrons, which gives the majority of the properties of said compounds and, secondly, a group of 2 or 3 atoms located in the empty spaces, i.e. at the centre of the rhombohedron. This structure is of particular interest since the atoms located in the empty spaces can be exchanged to insert radioactive element atoms while retaining the radiation stability properties of boron carbide $B_4C$.

According to a first embodiment of the confinement matrix according to the invention, the long-life radioactive element(s) is/are inserted in the crystalline network of the boron compound. They can thus be included in the empty spaces located at the centre of the rhombohedrons.

According to a second embodiment of the matrix according to the invention, said matrix is in the form of a composite material wherein the long-life radioactive element(s) is/are dispersed in oxide form, the standard precursor form, in the rhombohedral structured boron compound.

In this case, the boron compound may be for example $B_4C$, $B_3Si$ or $B_6O$.

In said second embodiment, the boron compound used corresponds to boron carbide wherein the carbon has been replaced by other elements.

Said replacement makes it possible to obtain the required corrosion resistance in the presence of aqueous media. Indeed, boron carbide shows said accelerated corrosion due to the formation on its surface of a layer of boric anhydride solution in aqueous media and in the presence of radiation. By replacing carbon by oxygen or silicon, the production of said boric anhydride is prevented.

Indeed, in the case of $B_3Si$, a film of passivating $SiO_2$ and, in the case of $B_6O$, no additional oxidation into $B_2O_3$ is possible.

Said matrices according to the invention also offer a high heat-resistance since they have very high melting points, of at least 1800° C., a good stability under irradiation, a good inertia in aqueous media and the possibility to incorporate a wide range of elements in said structure.

It was also observed that in the case of the boron compound $B_3Si$, said compound is subject to less degradation under irradiation by helium ions than the compound $B_4C$.

According to the invention, it is possible to adapt the composition of the boron compound to the desired use of the confinement matrix. In this way, when the confinement matrix is intended for the incineration of at least one radioactive element, it is beneficial to use a boron compound, wherein the boron is enriched with $^{11}B$ to benefit from the neutron moderating properties of $^{11}B$.

The confinement matrices according to the invention may be prepared using methods implementing powder metallurgy techniques.

In addition, the invention also relates to a method to prepare a long-life radioactive element confinement matrix comprising at least one crystalline compound of a rhombohedral structure in the crystalline network of which the long-life radioactive element(s) is/are inserted, which consists of mixing a powder of said radioactive element(s) or compound(s) of said element(s) with a boron powder or a boron precursor, and then producing a hot reaction of the powder mixture at a temperature of 800 to 1500° C. and sintering the powders obtained.

In this method, the hot powder mixing reaction and sintering operations of the powders obtained may be carried out at the same time by means of reactive sintering of the powder mixture at a temperature of 1000 to 1800° C. at a pressure of 30 to 200 MPa.

In this method, the powder mixture may also comprise one or more additives chosen from metals, catalysts, metal oxides or any adjuvant required to form the matrix or improve its properties.

The metals may be in particular Mg, Ca, Zn. They are used either as catalysts (for example magnesiothermic or calciothermic reaction) or as an addition of oxygen (for example ZnO).

When the powder mixture comprises a catalyst, said catalyst may be used to favour the formation of the desired rhombohedral structure boron compound.

The metal oxides used are generally also added to favour the formation of the desired boron compound. An example of oxides includes zinc oxide and magnesium oxide.

The boron precursor may be chosen from boron oxides such as $B_2O_3$, boric anhydride $H_3BO_3$, boron and silicon compounds such as $B_3Si$, oxygen and boron compounds such as $B_6O$ and boron carbide $B_4C$.

In this method, the radioactive element may be in the form of a compound such as an oxide.

With this method, it is possible to prepare a $B_3Si$ type boron compound including in its crystalline network at least one radioactive element, using, as the powder mixture, a mixture of powders of boron, silicon and at least one radioactive element. In this case, it is possible to produce the hot reaction and sintering at the same time by carrying out reactive sintering at a temperature of 1300 to 1400° C., at a pressure of 30 to 200 MPa.

If the boron compound produced is of the $B_6O$ type, incorporating in its network the radioactive element(s), it is possible to start with a powder mixture composed of boron powder, a metal oxide such as ZnO, and at least one radioactive element. In this case, the powders are first reacted at a temperature of 1000 to 1500° C. under an inert gas stream, and the sintering is then carried out at a temperature of 1200 to 1800° C. at a pressure of 30 to 200 MPa.

According to the invention, it is also possible to prepare a confinement matrix in the form of a composite material, comprising a crystalline boron compound of a rhombohedral structure wherein the long-life radioactive element is dispersed using a method comprising:

mixing of a powder of the rhombohedral structure crystalline boron compound with a powder of the radioactive element or a compound of said element chosen from oxides, and pressurised sintering of the mixture obtained at a temperature of 1000 to 1800° C., at a pressure of 30 to 200 MPa.

In the latter case, the boron compound may advantageously be $B_3Si$, $B_6O$ or $B_4C$.

In the confinement matrix according to the invention, the radioactive element(s) included may represent 5 to 20% of the material by weight.

The invention's other characteristics and advantages will be seen more clearly upon reading the following example, which is given as an illustration and is not restrictive.

DETAILED DESCRIPTION OF EMBODIMENT

The following example illustrates the preparation of a confinement matrix in the form of $B_4C$ based composite material.

In this example, $CeO_2$ is used to simulate $PuO_2$ with a view to incineration matrices.

12 g of $B_4C$ powder is mixed with 1.2 g of $CeO_2$ powder, both powders having a grain size of less than 50 μm. The homogeneous powder mixture is then subjected to sintering under a uniaxial load at a temperature of 1800° C. at a pressure of 30 MPa.

This gives a composite material wherein 8% by weight of cerium is dispersed in $B_4C$.

REFERENCE

[1]: WO95/02886.

What is claimed is:

1. A confinement matrix for the storage or incineration of at least one long-life radioactive element, comprising:
    at least one crystalline boron compound of a rhombohedral structure comprising said at least one long-life radioactive element.

2. The matrix according to claim 1, wherein said at least one long-life radioactive element is inserted in the crystalline network of the boron compound.

3. The matrix according to claim 1, wherein said at least one long-life radioactive element is dispersed in oxide form in the rhombohedral structured boron compound.

4. The matrix according to claim 3, wherein the boron compound is $B_3Si$.

5. The matrix according to claim 3, wherein the boron compound is $B_6O$.

6. The matrix according to claim 3, wherein the boron compound is $B_4C$.

7. The matrix according to claim 1 for the incineration of at least one radioactive element, wherein the boron of the boron compound is enriched with $^{11}B$.

8. A method for preparing a confinement matrix for at least one long life radioactive element, comprising:
    mixing a powder of said at least one long-life radioactive element or a powder of at least one compound of said at least one long-life element with a boron powder or a boron precursor, to obtain a powder mixture, and
    then producing a hot reaction of the powder mixture at a temperature of 800 to 1500° C. and sintering the powders obtained;
    thereby obtaining said confinement matrix which comprises at least one crystalline compound of a rhombohedral structure in the crystalline network into which said at least one long-life radioactive element is inserted.

9. The method according to claim 8, wherein the powder mixture also comprises one or more additives selected from the group consisting of metals, catalysts, metal oxides, and the adjuvants required to form the matrix or improve its properties.

10. The method according to claim 8, wherein the boron precursor is selected from the group consisting of $B_2O_3$, $H_3BO_3$, $B_3Si$, $B_6O$ and $B_4C$.

11. The method according to claim 8, wherein the powders of the mixture are powders of boron, a metal oxide and at least one radioactive element,
    wherein the powders are first reacted at a temperature of 1000 to 1500° C., under an inert gas stream, and
    wherein the sintering is then carried out at a temperature of 1200 to 1800° C., at a pressure of 30 to 200 MPa.

12. A method for preparing a confinement matrix for at least one long-life radioactive element, comprising:
    mixing a powder of said at least one long-life radioactive element or a powder of at least one compound of said at least one long-life element with a boron powder or a boron precursor, to obtain a powder mixture; and then a hot reaction and sintering are performed at the same time by reactive sintering at a temperature of 1000 to 1800° C., at a pressure of 30 to 200 MPa;

thereby obtaining said confinement matrix which comprises at least one crystalline compound of a rhombohedral structure in the crystalline network into which said at least one long-life radioactive element is inserted.

13. The method according to claim 9, wherein the powders of the mixture are powders of boron, a metal oxide and at least one radioactive element, and wherein the reactive sintering is performed at a temperature of 1300 to 1400° C., at a pressure of 30 to 200 MPa.

14. A method for preparing a confinement matrix in the form of a composite material, comprising:

dispersing at least one long-life radioactive element in a crystalline boron compound of a rhombohedral structure by a method comprising:

mixing of a powder of the crystalline boron compound having said rhombohedral structure with a powder of the radioactive element or a compound of said element selected from the group consisting of oxides, to obtain a mixture; and pressurised sintering of the mixture at a temperature of 1000 to 1800° C., and at a pressure of 30 to 200 MPa.

15. The method according to claim 14, wherein the boron compound is $B_4C$, $B_6O$ or $B_3Si$.

* * * * *